May 17, 1955

A. J. LECLERC ET AL 2,708,401

TEA BAG RECEPTACLE AND SQUEEZER

Filed Nov. 29, 1951

INVENTOR.
ARMAND J. LECLERC
BY RAYMOND W. LECLERC

Chas. R. Fay,
ATTORNEY

United States Patent Office 2,708,401
Patented May 17, 1955

2,708,401
TEA BAG RECEPTACLE AND SQUEEZER

Armand J. Leclerc and Raymond W. Leclerc, Leominster, Mass.

Application November 29, 1951, Serial No. 258,876

1 Claim. (Cl. 100—234)

This invention relates to a new and improved tea bag receptacle, for manipulation of a tea bag, and also for the purpose of providing a squeezing action for lemons and the like.

The principal object of the present invention resides in the provision of a device of the class described comprising a pair of interpivoted elongated arms, each having enlarged or widened finger-gripping portions adjacent the pivot and one of said arms having at the opposite end thereof a concaved receptacle of a size and shape for holding a tea bag, slice of lemon, or the like, the other arm being provided with a perforated paddle or plate generally fitting the receptacle and cooperating therewith.

Another object of the invention resides in the provision of a device as above stated including a generally U-shaped spring clip, the legs of which extend between the arms and outwardly through slots therein to partially overlie the arms at the outer aspects thereof to resiliently hold the arms together in a yieldable squeezing relationship, the closed end of the U-shaped clip forming a fulcrum for the two arms, the arms tending to approach each other so as to hold a tea bag in the receptacle without attention on the part of the user and having sufficient strength to lightly squeeze a lemon section.

Other objects and advantages of the invention will appear hereinafter.

Reference is to be had to the accompanying drawings in which.

Figure 1:
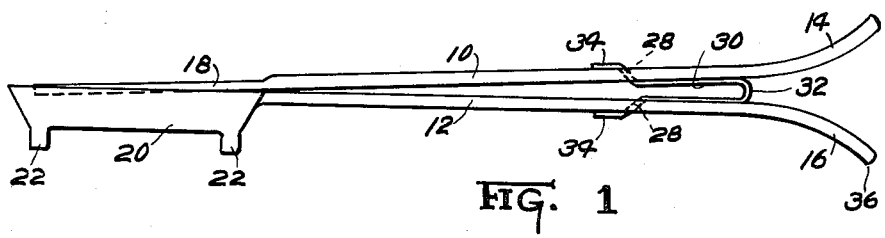
Fig. 1 is a view in side elevation of a device according to the invention.
Figure 2:
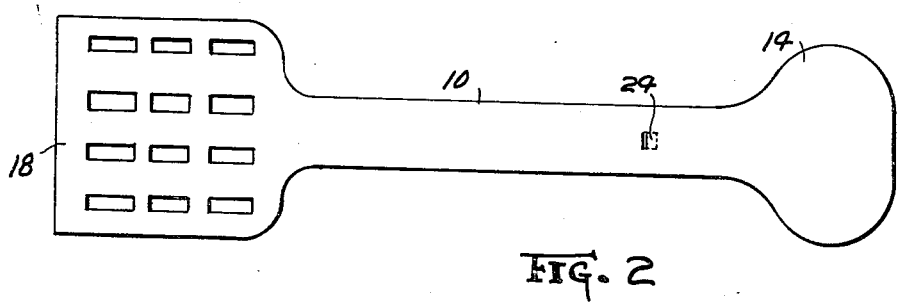
Fig. 2 is a plan view of one of the arms.
Figure 3:
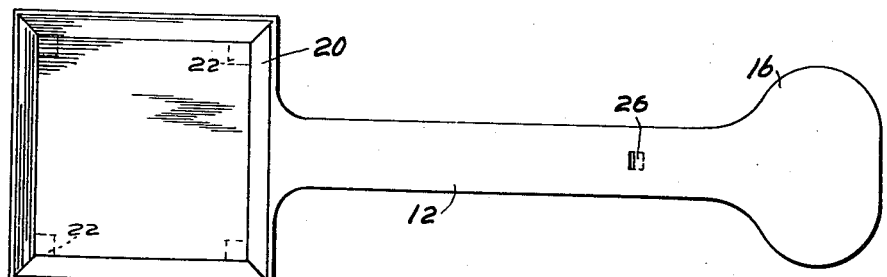
Fig. 3 is a plan view of the other arm.
Figure 4:
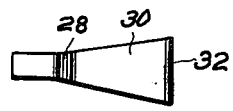
Fig. 4 is a plan view of the spring clip.

As shown in the drawing, this device comprises a pair of arms 10 and 12 of more or less the same size and shape, said arms being adapted to cooperate to form the device under consideration. Each arm is provided with an enlarged finger hold 14, 16 for easy manipulation thereof. The arm 10 terminates at its other end in a perforated paddle or plate indicated at 18 and generally fitting a concaved receptacle 20 located at the corresponding end of the other arm 12. The concaved receptacle 20 is provided with feet 22 which enable the receptacle 20 to stand otherwise unsupported in stable condition on a table top or the like.

Each arm 10 and 12 is provided with a slot 24, 26 through which extends the angled portions 28 of a spring clip 30. This clip is of general U-shape, having a closed end 32. The angled portions 28 terminate in feet 34 and extend through the holes 24, 26 so that the feet 34 overlie the exterior surfaces of the two arms and grip them resiliently causing the arms to normally press together as shown in Fig. 1. The enlargements 14 and 16 provide finger holds or grips by which the arms may be separated as will be clear, the arms then fulcruming on the rounded portions of the closed end 32 of the spring clip.

In use, the device may be turned upside down, the arms separated by the action of the fingers, and the tea bag in the cup may be grasped by sliding the paddle or plate 18 thereunder.

The finger-grip portions 14 and 16 are then merely released and tea bag is slightly squeezed in the receptacle, the liquid therefrom running through plate 18 back into the cup. The device may then be turned over into the Fig. 1 position and set down upon the table without dripping at all on the table surface or cloth. In this position, the device is very stable, the legs 22 lying in the same general plane as the extreme end of arm 12 as at 36.

The device is preferably made of molded plastic, and is light weight, inexpensive to manufacture, extremely convenient and easy to use, and adaptable for several different purposes as disclosed.

Having thus described our invention and the advantages thereof, we do not wish to be limited to the details herein disclosed otherwise than as set forth in the claim, but what we claim is:

A tea bag receptacle and lemon squeezer comprising a pair of elongated arms pivoted together intermediate their ends, said arms each including an enlarged finger-grip portion at corresponding ends thereof, an open top receptacle defined by a closed flat bottom and closed continuous upstanding side surfaces carried at the opposite end of one arm, a squeezer plate having a plurality of perforations carried at the corresponding end of the other arm, said squeezer plate being smaller in periphery than the receptacle whereby a portion thereof is adapted to extend into the same so that the receptacle may receive dripping from the squeezer plate, a spring clip of general U-shape between the arms, the bight of the U forming a fulcrum for the arms, and the legs of the spring clip being secured to the respective arms to yieldingly hold the arms together with the squeeze plate portion extending into the receptacle, said spring clip legs overlying the opposite side surfaces of the arms, the legs of the spring clip extending away from the finger-grip end portions of the arms, and means on the receptacle to support the same on a surface open side up, the finger grip end portion of said one arm being on general level with the receptacle supporting means so that the latter may rest horizontally on said surface.

References Cited in the file of this patent
UNITED STATES PATENTS

| | | |
|---|---|---|
| D. 76,013 | Gordon | Aug. 14, 1928 |
| D. 124,195 | Katzky | Dec. 24, 1940 |
| 233,185 | Baker | Oct. 12, 1880 |
| 359,653 | Wettstein | Mar. 22, 1887 |
| 1,176,778 | Rittleman | Mar. 28, 1916 |
| 1,305,806 | Keppeler | June 3, 1919 |
| 2,455,623 | Stone | Dec. 7, 1948 |
| 2,484,461 | Perry | Oct. 11, 1949 |
| 2,496,109 | Terry | Jan. 31, 1950 |